(12) United States Patent
Oprasic et al.

(10) Patent No.: US 10,350,686 B2
(45) Date of Patent: Jul. 16, 2019

(54) CUTTING INSERT AND MILLING TOOL

(71) Applicant: SANDVIK INTELLECTUAL PROPERTY AB, Sandviken (SE)

(72) Inventors: Amil Oprasic, Sandviken (SE); Leif Widin, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/561,044

(22) PCT Filed: Mar. 3, 2016

(86) PCT No.: PCT/EP2016/054550
§ 371 (c)(1),
(2) Date: Sep. 23, 2017

(87) PCT Pub. No.: WO2016/150672
PCT Pub. Date: Sep. 29, 2016

(65) Prior Publication Data
US 2018/0221969 A1    Aug. 9, 2018

(30) Foreign Application Priority Data

Mar. 25, 2015 (EP) .................................. 15160853

(51) Int. Cl.
*B23C 5/06* (2006.01)
*B23C 5/20* (2006.01)
*B23C 5/10* (2006.01)

(52) U.S. Cl.
CPC .............. *B23C 5/06* (2013.01); *B23C 5/207* (2013.01); *B23C 5/109* (2013.01); *B23C 2200/0494* (2013.01); *B23C 2200/125* (2013.01)

(58) Field of Classification Search
CPC ..... B23C 5/109; B23C 5/2221; B23C 5/2247; B23C 2200/125; B23C 2200/0494; B23C 5/06; B23C 5/207; B23B 2200/3681
See application file for complete search history.

(56) References Cited

U.S. PATENT DOCUMENTS 4,294,566 A * 10/1981 Boone ................ B23B 27/1622
407/104
5,332,338 A    7/1994  Satran et al.
(Continued)

FOREIGN PATENT DOCUMENTS

CN        1382078 A    11/2002
CN      102844139 A    12/2012
(Continued)

*Primary Examiner* — Sara Addisu
(74) *Attorney, Agent, or Firm* — Corinne R. Gorski

(57) ABSTRACT

A cutting insert includes an insert body having a central longitudinal axis. The insert body has a first radial side and a second radial side. A first axial side includes a first relief face, a second relief face, and a first recess having a first bottom surface. The first relief face, the second relief face, and the first bottom surface are arranged such that each point of same is visible from either a first side view towards the first radial side or from a second side view towards the second radial side. The insert body is longer along the longitudinal direction at a central portion towards the central longitudinal axis than at an outer portion towards one of the first or second radial sides. Further a milling tool is disclosed.

15 Claims, 4 Drawing Sheets

(56) References Cited

U.S. PATENT DOCUMENTS

| | | | | |
|---|---|---|---|---|
| 5,382,118 A * | 1/1995 | Satran | ............... | B23C 5/06 407/113 |
| 5,454,670 A * | 10/1995 | Noda | ............... | B23C 5/006 407/114 |
| 6,966,729 B2 * | 11/2005 | Dehn | ............... | B23C 5/22 407/113 |
| 7,909,544 B2 * | 3/2011 | Jansson | ............... | B23C 5/06 407/100 |
| 7,922,427 B2 * | 4/2011 | Spitzenberger | ............... | B23C 5/006 407/102 |
| 8,277,151 B2 * | 10/2012 | Wandeback | ............... | B23C 5/06 407/113 |
| 8,454,278 B2 * | 6/2013 | Hartlohner | ............... | B23B 27/1618 407/113 |
| 2003/0223832 A1 * | 12/2003 | Roman | ............... | B23B 27/145 408/224 |
| 2004/0013478 A1 * | 1/2004 | Dehn | ............... | B23C 5/22 407/113 |
| 2007/0292219 A1 * | 12/2007 | Craig | ............... | B23C 5/207 407/48 |
| 2008/0273931 A1 * | 11/2008 | Spitzenberger | ............... | B23C 5/202 407/51 |
| 2009/0155004 A1 * | 6/2009 | Jansson | ............... | B23C 5/06 407/40 |
| 2009/0155005 A1 * | 6/2009 | Jansson | ............... | B23C 5/06 407/114 |
| 2010/0119313 A1 * | 5/2010 | Hartlohner | ............... | B23B 27/1618 407/103 |
| 2011/0020080 A1 * | 1/2011 | Zettler | ............... | B23C 5/06 407/113 |
| 2012/0039678 A1 * | 2/2012 | Nguyen | ............... | B23C 5/109 407/113 |
| 2013/0045061 A1 * | 2/2013 | Ishi | ............... | B23C 5/109 409/132 |
| 2013/0108387 A1 * | 5/2013 | Ishi | ............... | B23C 5/109 409/132 |
| 2013/0108388 A1 * | 5/2013 | Ishi | ............... | B23C 5/109 409/132 |
| 2013/0115022 A1 * | 5/2013 | Ishi | ............... | B23C 5/109 409/132 |
| 2013/0129432 A1 * | 5/2013 | Jaeger | ............... | B23C 5/207 407/42 |
| 2013/0129435 A1 * | 5/2013 | Ortlund | ............... | B23B 27/16 407/70 |
| 2013/0142580 A1 * | 6/2013 | Konta | ............... | B23C 5/109 407/100 |
| 2013/0156515 A1 * | 6/2013 | Satran | ............... | B23C 5/207 407/48 |
| 2013/0195566 A1 * | 8/2013 | Bhagath | ............... | B23C 5/207 407/33 |
| 2013/0251464 A1 * | 9/2013 | Hecht | ............... | B23C 5/06 407/48 |
| 2013/0302099 A1 * | 11/2013 | Choi | ............... | B23C 5/08 407/113 |
| 2014/0010605 A1 * | 1/2014 | Smilovici | ............... | B23C 5/06 407/42 |
| 2014/0064864 A1 * | 3/2014 | Kaufmann | ............... | B23B 27/141 407/114 |
| 2014/0212228 A1 * | 7/2014 | Horiike | ............... | B23C 5/109 407/42 |
| 2014/0212229 A1 * | 7/2014 | Diepold | ............... | B23C 5/202 407/42 |
| 2014/0298967 A1 * | 10/2014 | Ishi | ............... | B23C 5/109 83/13 |
| 2014/0334890 A1 * | 11/2014 | Takahashi | ............... | B23C 5/109 407/114 |
| 2014/0348599 A1 * | 11/2014 | Kovac | ............... | B23B 27/1611 407/42 |
| 2015/0071717 A1 * | 3/2015 | Morrison | ............... | B23C 5/207 407/51 |
| 2016/0158854 A1 * | 6/2016 | Ishi | ............... | B23C 5/207 409/131 |
| 2017/0197256 A1 * | 7/2017 | Zhang | ............... | B23C 5/006 |
| 2017/0291231 A1 * | 10/2017 | Mao | ............... | B23C 5/109 |
| 2017/0326657 A1 * | 11/2017 | Pettersson | ............... | B23C 5/109 |
| 2017/0368616 A1 * | 12/2017 | Rue | ............... | B23C 5/06 |

FOREIGN PATENT DOCUMENTS

| | | | |
|---|---|---|---|
| CN | 103025462 A | 4/2013 | |
| CN | 103648695 A | 3/2014 | |
| EP | 2774706 A1 | 9/2014 | |
| JP | 2013107198 A * | 6/2013 | ............ B23C 5/207 |
| WO | 95/30505 A1 | 11/1995 | |

\* cited by examiner

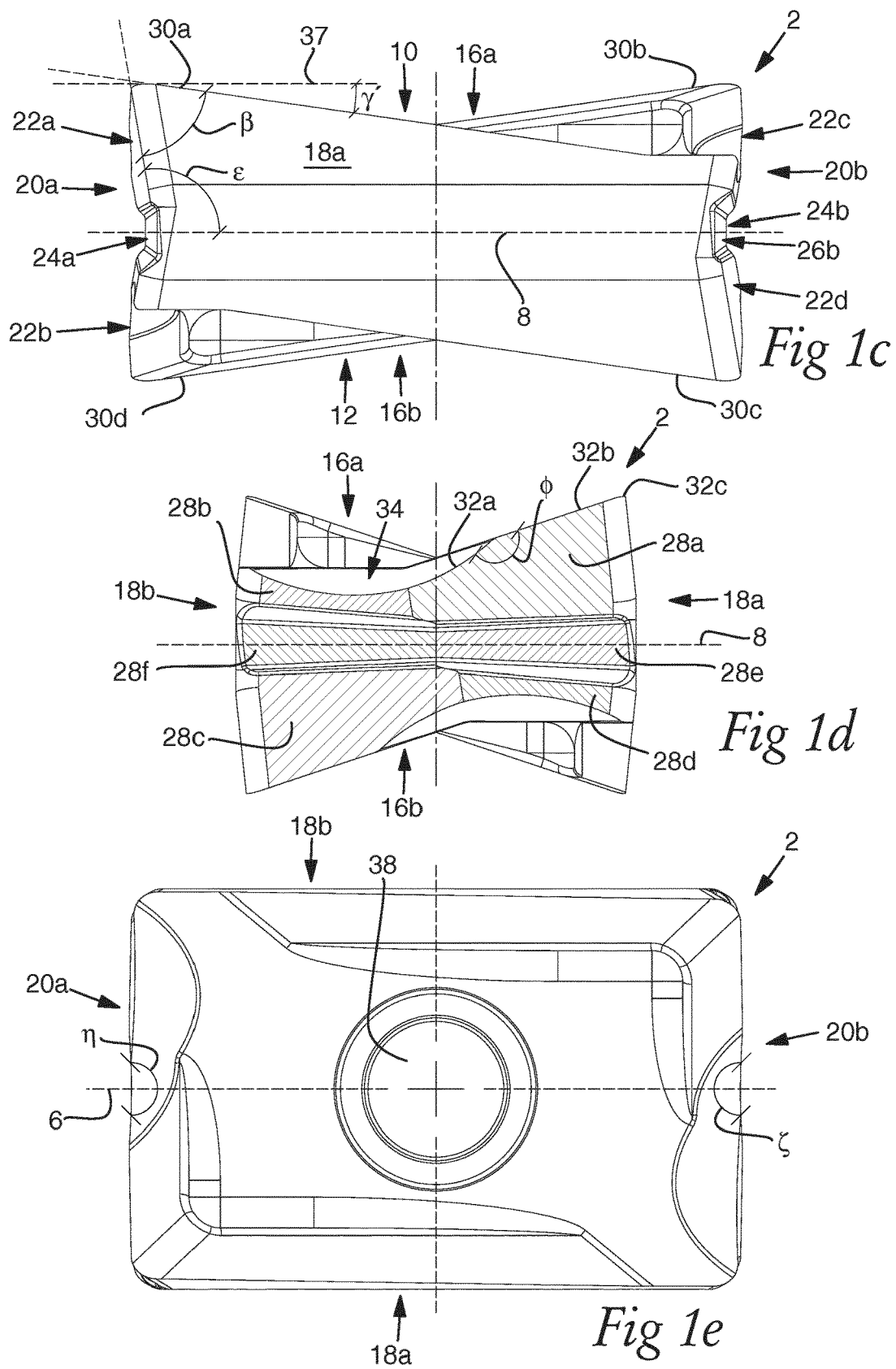

CUTTING INSERT AND MILLING TOOL

RELATED APPLICATION DATA

This application is a § 371 National Stage Application of PCT International Application No. PCT/EP2016/054550 filed Mar. 3, 2016 claiming priority to EP Application No. 15160853.6 filed Mar. 25, 2015.

TECHNICAL FIELD

The present invention relates to a cutting insert for a milling tool, and to a milling tool comprising such a cutting insert.

BACKGROUND

A milling tool is a rotating cutting tool, which may be provided with one or more cutting inserts. A face milling tool is a particular kind of milling tool configured for "facing", i.e. milling plane surfaces.

US 2013/0045061 discloses a cutting insert for a rotating cutting tool. The cutting insert includes an upper surface, a lower surface, and a side surface which is connected to each of the upper surface and the lower surface. The cutting insert is four times indexable in the cutting tool. A cutting edge extends at an intersection of the upper surface and the side surface, and includes a first cutting edge, a corner cutting edge, and a second cutting edge. Along the side surface constraining parts including flat surface shaped parts extend around the cutting insert. The cutting insert is shaped to be used with a negative axial rake angle in the rotating cutting tool.

Due to its shape, the cutting insert of US 2013/0045061 is cumbersome to manufacture. For instance the constraining parts have to be produced by a separate grinding step, subsequently to pressing and sintering of the cutting insert.

SUMMARY

It is an object of the present invention to provide a cutting insert which is easily manufactured.

According to an aspect of the invention, the object is achieved by a cutting insert for a milling tool, the cutting insert comprising an insert body having a central longitudinal axis extending along a longitudinal direction of the insert body and an imaginary centre plane comprising the central longitudinal axis. The insert body is generally defined by a top surface, a bottom surface, and a circumferential surface extending between the top surface and the bottom surface, the top and bottom surfaces extending substantially in the longitudinal direction on opposite sides of the centre plane. The insert body at the top surface comprises a first rake face and the bottom surface comprises a second rake face. The insert body at the circumferential surface comprises a first radial side and a second radial side extending in the longitudinal direction on opposite sides of the insert body, and a first axial side and a second axial side extending across the longitudinal direction on opposite sides of the insert body. The first axial side comprises a first relief face, a second relief face, and a first recess, the first relief face extending along the first rake face and the second relief face extending along the second rake face. The first recess extends between the first and second relief faces and comprises a first bottom surface. The insert body further comprises at least a first cutting edge, the first cutting edge extending along a rim portion at an intersection between the first rake face and both the first radial side and the first axial side. The first relief face, the second relief face, and the first recess are arranged such that each point of the first relief face, the second relief face, and the first recess is visible from either a first side view towards the first radial side or from a second side view towards the second radial side, and such that the insert body is longer along the longitudinal direction at a central portion towards the central longitudinal axis than at an outer portion towards one of the first or second radial sides.

Since each point of the first relief face, the second relief face, and the first recess is visible from one of the first and second side views and the insert body is longer at a central portion towards the central longitudinal axis than at an outer portion towards one of the first or second radial sides, the cutting insert is formable by multiaxial pressing (MAP) with a partition of a relevant pressing tool at the central longitudinal axis, the first and second relief faces and the first recess being formable in the MAP operation. As a result, the above mentioned object is achieved.

The first and second side views are seen along the centre plane, perpendicularly to the longitudinal axis. The cutting insert may be configured to be attached to a tool body of a milling tool. The cutting insert may be configured for "facing", i.e. milling plane surfaces. The cutting insert may be adapted to be held in a recess forming an insert seat of the milling tool. The cutting insert may be indexable, i.e. the cutting insert may be positioned in different positions in the insert seat of the milling tool. The first cutting edge may extend from the insert seat to engage with a workpiece in a mill.

The cutting insert may be manufactured from a material comprising e.g. one or more of cemented carbide, ceramics, cubic boron nitride, polycrystalline diamond, and/or cermet. The cutting insert may be coated with surface coatings such as e.g. titanium nitride, titanium carbonitride, and/or aluminium oxide.

According to embodiments, each of the first relief face, the second relief face, and the first bottom surface may comprise two major surfaces. A major surface may form at least one fifth of the relevant first relief face, second relief face, or first bottom surface. A major surface forms a continuous surface without any major or abrupt directional changes along the surface. At a major directional change or at an abrupt directional change, the major surface ends.

According to embodiments an angle between each of the two major surfaces of the first relief face, the second relief face, and the first bottom surface may be obtuse, such that the insert body is longer along the longitudinal direction at a central portion of one of said major surfaces towards the central longitudinal axis than at an outer portion of said one of said major surfaces towards one of the first or second radial sides. The obtuse angle between each of the two major surfaces of the first relief face, the second relief face, and the first bottom surface may give the cutting insert a slightly pointed shape at the first axial side.

According to embodiments, the two major surfaces of each of the first relief face, the second relief face, and the first bottom surface may be flat surfaces. According to alternative embodiments, at least one of the major surfaces of each of the first and second relief faces may be convex. According to embodiments, the first bottom surfaces may be perpendicular to the centre plane.

According to embodiments, the first relief face may form an obtuse angle with the centre plane, such that the insert body is longer in the longitudinal direction at the first cutting edge than adjacent to the first recess. In this manner a relief may be provided at the first cutting edge with the centre plane of the cutting insert arranged at a neutral, or only slightly negative, axial angle in in a relevant milling tool. Further, an acute wedge angle may be provided at the first cutting edge at the first axial side. Thus, a positive axial rake angle may be provided at the first axial side with the centre plane of the cutting insert extending at a neutral or only slightly negative axial angle in a relevant milling tool. This entails that the cutting insert may be securely positioned in an insert seat of the milling tool.

According to embodiments, the first cutting edge may comprise a first edge portion and a second edge portion extending along the first relief face, a third edge portion extending along the first radial side, and a corner edge portion, wherein the first edge portion may adjoin to the second edge portion, the second edge portion may adjoin to the corner edge portion, and the corner edge portion may adjoin to the third edge portion. The first edge portion may extend at an angle to the second edge portion from the second edge portion towards the centre plane. In this manner the cutting insert may be ramped into a workpiece, i.e. a relevant milling tool may be fed into the workpiece in the axial direction of the milling tool, commonly the Z direction of a relevant milling machine. The second edge portion may in such case lead the cut into the workpiece in the Z direction, while the first cutting edge due to its angle and direction does not interfere with the cut in the Z direction.

According to embodiments, the first edge portion may form an edge portion of a depression formed in the first rake face.

According to embodiments, the second axial side may comprise a third relief face, a fourth relief face, and a second recess, the third relief face extending along the first rake face and the fourth relief face extending along the second rake face. The second recess may extend between the third and fourth relief faces and may comprise a second bottom surface. The third relief face, the fourth relief face, and the second recess may be arranged such that each point of the third relief face, the fourth relief face, and the second recess is visible from either the first side view towards the first radial side or from the second side view towards the second radial side, and such that the insert body is longer along the longitudinal direction at a central portion towards the central longitudinal axis than at an outer portion towards one of the first or second radial sides. Accordingly, the insert body may be longer along the longitudinal direction at a central portion towards the central longitudinal axis than at an outer portion towards one of the first or second radial sides. In this manner also at the second axial side the cutting insert may be configured to be formable by multiaxial pressing (MAP) with a partition of a relevant pressing tool at the central longitudinal axis, the third and fourth relief faces and the second recess being formable in the MAP operation.

Similarly to the first axial side, each of the third relief face, the fourth relief face, and the second bottom surface may comprise two major surfaces. Also, an angle between each of the two major surfaces of the third relief face, the fourth relief face, and the second bottom surface may be obtuse. Again, the obtuse angle may give the cutting insert a slightly pointed shape, in this case at the second axial side.

According to embodiments, the insert body may be longest along the longitudinal direction at a central portion adjacent to the central longitudinal axis and gradually decreasing in length towards the first and second radial sides, such that a partition line of a multiaxial pressing tool for forming the cutting insert is positionable at the central portion.

According to embodiments, the insert body may comprise a second cutting edge extending along a rim portion at an intersection between the first rake face and both the second radial side and the second axial side, a third cutting edge extending along a rim portion at an intersection between the second rake face and both the first radial side and the second axial side, and a fourth cutting edge extending along a rim portion at an intersection between the second rake face and both the second radial side and the first axial side, such that the cutting insert is four times indexable in a milling tool. In other words, the cutting insert may be rotationally symmetrical around the central longitudinal axis and around a central transverse axis that is perpendicular the longitudinal axis.

According to a further aspect of the invention there is provided a milling tool configured to be rotated about a rotation axis comprising a tool body, wherein the tool body at an axial end portion thereof is provided with an insert seat for receiving a cutting insert. The milling tool comprises a cutting insert according to any aspect and/or embodiment discussed herein arranged in the insert seat.

The milling tool may be provided with more than one cutting insert according to aspects and/or embodiments discussed herein. The milling tool may be a face milling tool, i.e. a milling tool for milling plane surfaces.

According to embodiments, the insert seat may be provided with a tangential support surface, a radial support surface, and an axial support surface. The cutting insert may be arranged with a portion of the second rake face abutting against the tangential support surface, a portion of the second radial side abutting against the radial support surface, and a portion of the second bottom surface of the second recess abutting against the axial support surface. In this manner the cutting insert may be securely supported in the insert seat with the first cutting edge extending beyond the insert seat for cutting engagement with a workpiece.

According to embodiments, the portion of the second bottom surface abutting against the axial support surface may be that major surface of the second bottom surface which is closest to the first radial side. Since this major surface is angled towards the central longitudinal axis, the cutting insert is direct in the radial direction by the axial cutting force, to which the cutting insert is subjected. In this manner the cutting insert may be biased towards the radial support surface and thus, locked securely in the insert seat.

According to embodiments, the tangential support surface may extend from a first end portion at an axial end of the tool body to a second end portion at the axial support surface of the insert seat, and wherein seen in a rotational direction of the milling tool the second end portion may extend ahead of the first end portion. In this manner the cutting insert may be positioned with the centre plane at a negative axial angle in the insert seat. Due to the first relief face forming an obtuse angle with the centre plane, a relief may be provided at the first cutting edge with the centre plane extending at only a slight negative axial angle.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIGS. 1a-1e illustrate different views of a cutting insert for a milling tool according to embodiments.

DETAILED DESCRIPTION

Figure 1A:
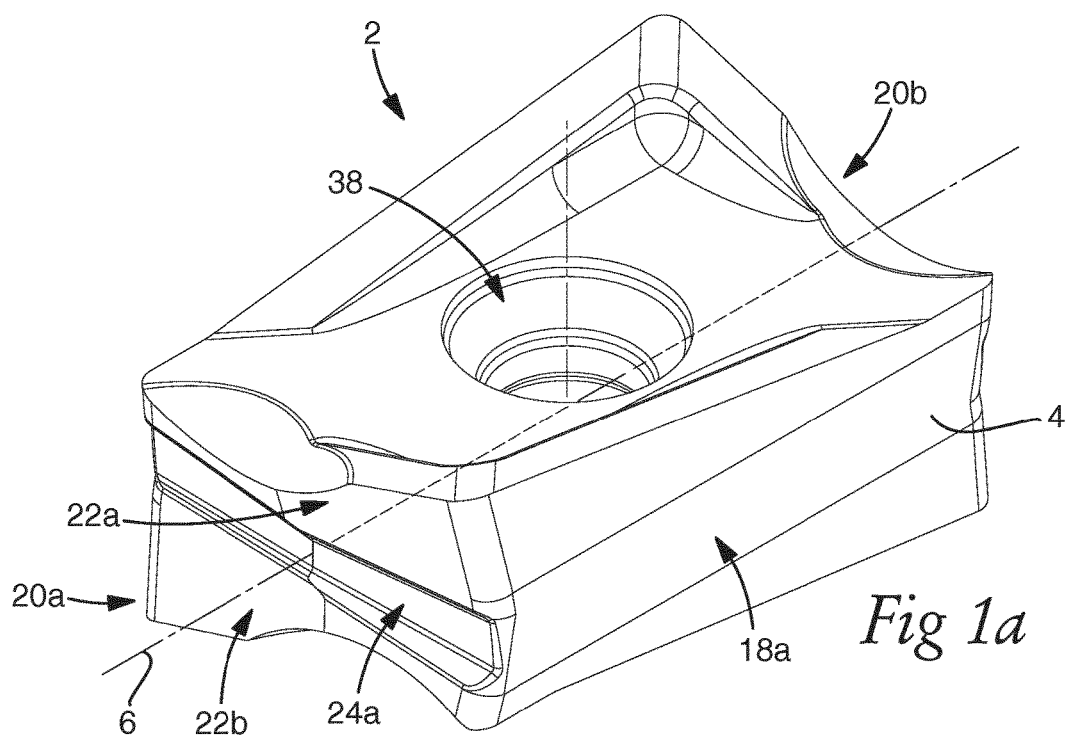
Figure 1B:
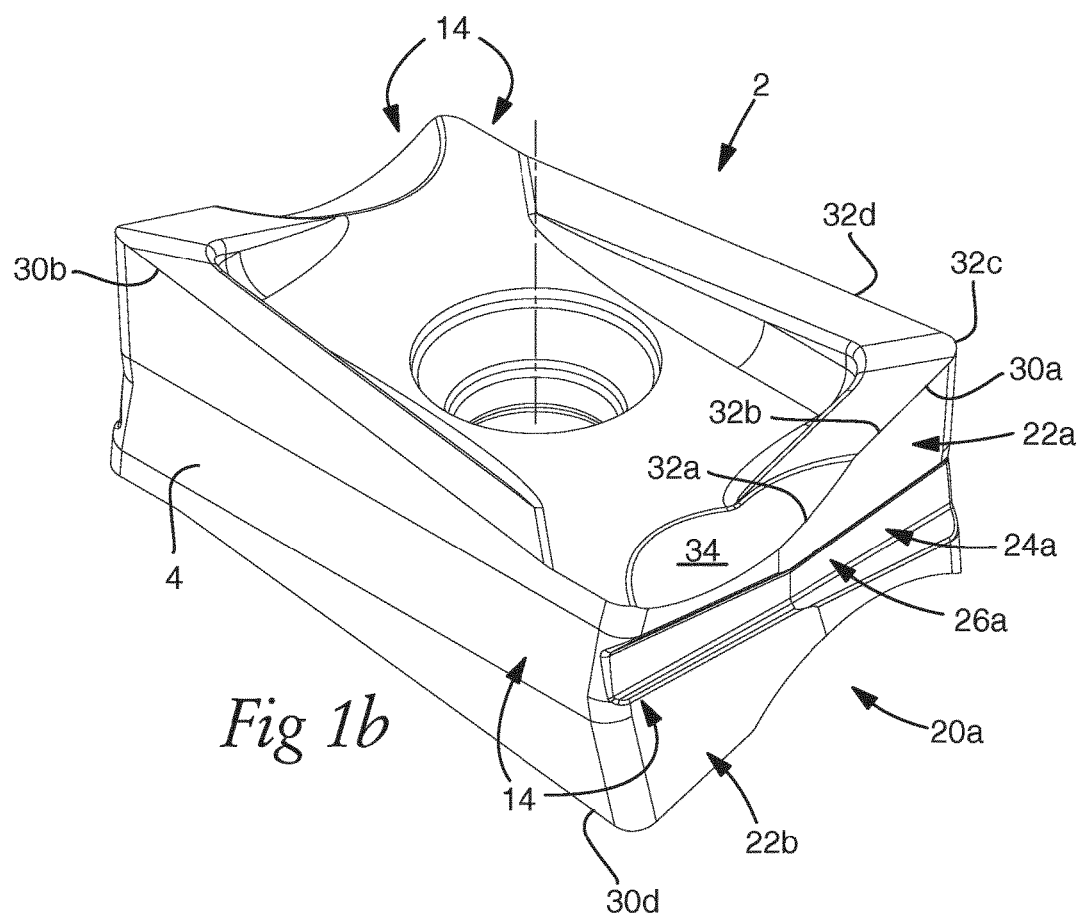

Aspects of the present invention will now be described more fully. Like numbers refer to like elements throughout. Well-known functions or constructions will not necessarily be described in detail for brevity and/or clarity.

FIGS. 1a-1e illustrate different views of a cutting insert 2 for a milling tool according to embodiments. The cutting insert 2 comprises an insert body 4 having a central longitudinal axis 6 extending along a longitudinal direction of the insert body 4. An imaginary centre plane 8 comprising the central longitudinal axis 6 extends centrally through the insert body 4, see FIGS. 1c and 1d. The insert body 4 is generally defined by a top surface 10, a bottom surface 12, and a circumferential surface 14 extending between the top surface 10 and the bottom surface 12, circumferentially about the insert body 4. The top and bottom surfaces 10, 12 extend substantially in the longitudinal direction on opposite sides of the centre plane 8. The insert body 4 comprises at the top surface 10 a first rake face 16a, and at the bottom surface 12 a second rake face 16b.

The insert body 4 at the circumferential surface 14 comprises a first radial side 18a and a second radial side 18b extending in the longitudinal direction on opposite sides of the insert body 4. The circumferential surface 14 further comprises a first axial side 20a and a second axial side 20b extending across the longitudinal direction and the longitudinal axis 6 on opposite sides of the insert body 4.

The first axial side 20a comprises a first relief face 22a, a second relief face 22b, and a first recess 24a. The first relief face 22a extends along the first rake face 16a and the second relief face 22b extends along the second rake face 16b. The first recess 24a extends between the first and second relief faces 22a, 22b, substantially along the centre plane 8. The first recess 24a comprises a first bottom surface 26a. The second axial side 20b comprises a third relief face 22c, a fourth relief face 22d, and a second recess 24b. The third relief face 22c extends along the first rake face 16a and the fourth relief face 22d extends along the second rake face 16b. The second recess 24b extends between the third and fourth relief faces 22c, 22d, substantially along the centre plane 8. The second recess 24b comprises a second bottom surface 26b.

The first relief face 22a, the second relief face 22b, and the first recess 24a are arranged such that each point of the first relief face 22a, the second relief face 22b, and the first recess 24a is visible from either a first side view towards the first radial side 18a or from a second side view towards the second radial side 18b. Accordingly, the insert body 4 is longer along the longitudinal direction at a central portion towards the central longitudinal axis 6 than at an outer portion towards one of the first or second radial sides 18a, 18b. The first and second side views are seen along the centre plane 8, perpendicularly to the longitudinal axis 6, i.e. as the view illustrated in FIG. 1c and a corresponding view from an opposite side of the insert body 4. Each of the first relief face 22a, the second relief face 22b, and the first bottom surface 26a comprises two major surfaces 28a-28f. The major surfaces 28a-28f have been indicated with linear hatching in FIG. 1d. An angle η between each of the two major surfaces 28a-28f of the first relief face 22a, the second relief face 22b, and the first bottom surface 24a is obtuse, such that the insert body 4 is longer along the longitudinal direction at a central portion of one of said major surfaces 28a-28f towards the central longitudinal axis 6 than at an outer portion of the said one of the major surfaces 28a-28f towards one of the first or second radial sides 18a, 18b, se FIG. 1e. The angle η between each of the two major surfaces 28a-28f may be within a range of 160-179.5 degrees. The angle η between the two major surfaces 28a-28d of the first and second relief faces 22a, 22c may be different than the angle η between the two major surfaces 28e, 28f of the first bottom surface 26a. The angle η between the two major surfaces 28a-28d of the first and second relief faces 22a, 22c may preferably be within a range of 176-179 degrees. The angle η between the two major surfaces 28e, 28f of the first bottom surface 26a may preferably be within a range of 160-179 degrees.

Similarly, the third relief face 22c, the fourth relief face 22d, and the second recess 24b are arranged such that each point of the third relief face 22c, the fourth relief face 22d, and the second recess 24b is visible from either the first side view towards or the second side view as discussed above in connection with the first axial side 20a. Again, the insert body 4 is longer along the longitudinal direction at a central portion towards the central longitudinal axis 6 than at an outer portion towards one of the first or second radial sides 18a, 18b. Similarly, each of the third relief face 22c, the fourth relief face 22d, and the second bottom surface 26b comprises two major surfaces, corresponding to the major surfaces 28a-28f of first relief face, the second relief face, and the first bottom surface illustrated in FIG. 1d. An angle ζ between each of the two major surfaces of the third relief face 22c, the fourth relief face 22d, and the second bottom surface 26b is obtuse, see FIG. 1e. Accordingly, also due to the obtuse angle ζ at the third relief face 22c, the fourth relief face 22d, and the second bottom surface 24b, the insert body 4 is longer along the longitudinal direction at a central portion towards the central longitudinal axis 6 than at one of the first or second radial sides 18a, 18b. The angle ζ between each of the two major surfaces of the third relief face 22c, the fourth relief face 22d, and the second bottom surface 24b may be the same as the corresponding angle η between each of the two major surfaces 28a-28f of the first relief face 22a, the second relief face 22b, and the first bottom surface 24a.

Put differently, the insert body 4 is the longest along the longitudinal direction at a central portion adjacent to the central longitudinal axis 6 and gradually decreases in length towards the first and second radial sides 18a, 18b. Accordingly, a partition line of a multiaxial pressing (MAP) tool for forming the cutting insert 2 is positionable at the central portion, see below with reference to FIG. 2.

Accordingly, the cutting insert 2 is formable by MAP with a partition of a relevant pressing tool at the central longitudinal axis 6. All of the major surfaces of first, second, third, and fourth relief faces and the first and second bottom surfaces 26a, 26b may be formed in the MAP operation. Being able to position a partition of a pressing tool at the central longitudinal axis 6 entails that the partition line is positioned in an area where any burrs in the insert body 4 from the MAP operation will not affect the use of the cutting insert 2 to any substantial extent.

Figure 2:
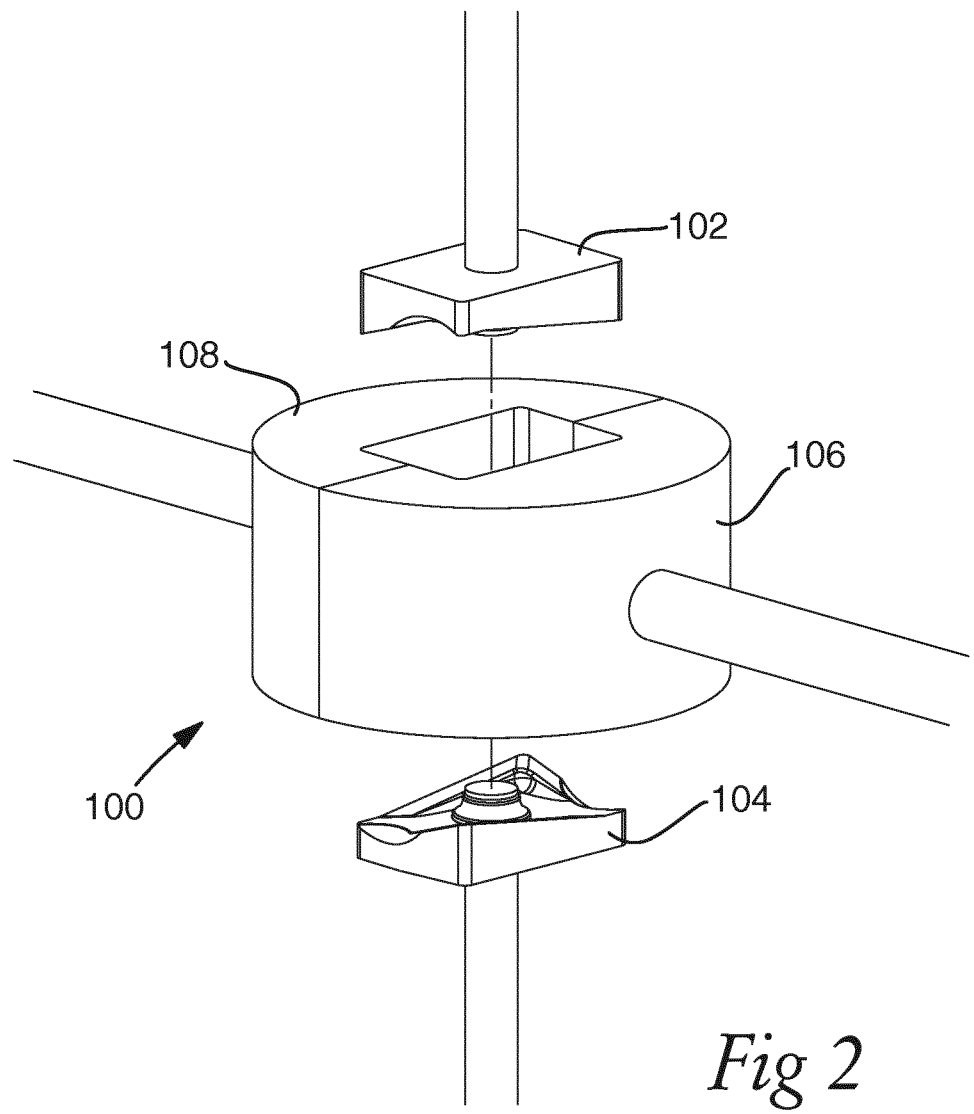
FIG. 2 illustrates embodiments of a multiaxial pressing (MAP) tool for forming a cutting insert according to the present invention.

FIG. 2 illustrates embodiments of a multiaxial pressing (MAP) tool 100 for forming a cutting insert according to the present invention. In the MAP operation a green ware of the cutting insert is formed, which green ware after sintering forms a cutting insert ready for use in a milling tool.

In conventional pressing, a powder compound is pressed between two vertical stamps into a recess of a die to form a green ware, which after sintering forms a cutting insert. In MAP the powder compound in question is pressed not only between the two stamps 102, 104 against the top surface and the bottom surface of the green ware to be manufactured, but also between at two additional stamps 106, 108, which are pressed against the sides and clearance surfaces of the insert body.

By shaping the cutting insert according to the present invention in the manner described above with the major surfaces of first, second, third, and fourth relief faces 22a-22d and the first and second bottom surfaces 24a, 24b at obtuse angles η, ζ, the two diametrically opposed, horizontally operating stamps 106, 108 can be retracted in a linear path of motion from the finish-pressed green ware in such a way that each point on the stamp surfaces, immediately clears from the green ware without scraping any surface of the same. In other words, the design of the cutting insert guarantees a good surface quality, something that in turn allows manufacture of directly pressed, non-ground cutting inserts having good dimensional accuracy. Thus, the cutting insert may obtain its final shape directly after pressing and sintering, and without needing to be after-treated by grinding or the like.

Accordingly, if the cutting insert is only intended for roughing a surface, or for planning a surface with lower finishing requirements, the cutting insert 2 may be used as pressed and sintered. This will render a cutting insert having a tolerance of approximately +/−0.03 mm.

If a better tolerance is required, the cutting insert requires grinding after sintering. A cutting insert according to the present invention also lends itself well for being precision ground to a tolerance within a few thousands of a mm. Since the first bottom surface is formed in the MAP operation, in case of grinding of the first and second relief faces 22a, 22b, see FIGS. 1b and 1c, of the first axial side 20a, the second bottom surface 26b may serve as a reference support surface during grinding. Accordingly, the first and second relief faces 22a, 22b may be ground without using one of the third or fourth relief faces 22c, 22d as a first reference surface. Thus, the internal relationship between the relief faces 22a-22d may be maintained, while they are positioned on the insert body 4 in relation to the second bottom surface 26b. Accordingly, grinding of the first and second relief surfaces 22a, 22b is independent of the third and fourth relief faces 22c, 22d.

Returning to FIGS. 1a-1e, the insert body 4 comprises a first cutting edge 30a. The first cutting edge 30a extends along a rim portion at an intersection between the first rake face 16a and both the first radial side 18a and the first axial side 20a. The first cutting edge 30a comprise a first edge portion 32a and a second edge portion 32b extending along the first relief face 22a, a corner edge portion 32c, and a third edge portion 32d extending along the first radial side 18a. The first edge portion 32a adjoins to the second edge portion 32b, the second edge portion 32b adjoins to the corner edge portion 32c, and the corner edge portion 32c adjoins to the third edge portion 32d.

The first edge portion 32a extends at an angle φ of at least 150 degrees and at most of 185 degrees to the second edge portion 32b as seen from the second edge portion 32b towards the centre plane 8, see FIG. 1d. In the example shown, the angle φ is 158 degrees. Since the first edge portion 32a extends at an angle φ to the second edge portion 32b and towards the centre plane 8, the second edge portion 32b may be positioned in a relevant milling tool to extend the farthest out in the longitudinal direction. With such an arrangement the milling tool and the cutting insert 2 may be ramped into a workpiece, i.e. the second edge portion 32b may lead a moderate downward cut into the workpiece, without the first edge portion 32a hindering the cut in the downward direction.

In these embodiments the first edge portion 32a forms an edge portion of a depression 34 formed in the first rake face 16a.

In these embodiments, at least one of the major surfaces of each of the first-fourth relief faces 22a-22d are convex. More specifically, of the first relief face 22a, the major surface 28a adjacent to the second edge portion 32b is convex, and the corresponding major surfaces of the second-fourth relief faces are convex.

Accordingly, in these embodiments, the second edge portion 32b is curved. Also, the first edge portion 32a is curved in these embodiments. In such case, where at least one of the first and second edge portions 32a, 32 is curved, the angle φ is measured between a tangent of the first edge portion 32a and a tangent of the second edge portion 32b, respectively, at the intersection between the first and second edge portions 32a, 32b.

According to alternative embodiments, the two major surfaces of each of the first-fourth relief faces 22a-22d and the first and second bottom surfaces 26a, 26b may be flat surfaces. In such embodiments, the second edge portion 32b is linear, i.e. straight.

The insert body 4 comprises a second cutting edge 30b extending along a rim portion at an intersection between the first rake face 16a and both the second radial side 18b and the second axial side 20b, a third cutting edge 30c extending along a rim portion at an intersection between the second rake face 16b and both the first radial side 18a and the second axial side 20b, and a fourth cutting edge 30d extending along a rim portion at an intersection between the second rake face 16b and both the second radial side 18b and the first axial side 20a. Thus, the cutting insert 2 is four times indexable in a relevant milling tool. Accordingly, each of the first, second, third, and fourth cutting edges 30a-30d, one at a time may be arranged in the milling tool to engage with a workpiece. Each of the second, third, and fourth cutting edges 30b-30d comprises first, second, third, and corner edge portions in the same manner as the first cutting edge 30a.

The first relief face 22a forms an obtuse angle ε with the centre plane 8, see FIG. 1c. The obtuse angle ε may be within a range of 92-105 degrees, preferably 94-100 degrees. Thus, the insert body 4 is longer in the longitudinal direction at the first cutting edge 30a than adjacent to the first recess 24a. Thus, an acute wedge angle β of e.g. 51-84 degrees, preferably 60-76 degrees, may easily be provided at the first cutting edge 30a at the first axial side 20a. Similarly, each of the second, third, and fourth relief faces 22b-22d forms an obtuse angle with the centre plane 8, such that an acute wedge angle may be provided also at each of the second, third, and fourth cutting edges 30b-30d at the respective axial sides 20a, 20b. An imaginary tangential plane 37 at the first cutting edge 30a extends in parallel with the centre plane 8. An angle γ' between the tangential plane 37 and the first rake face 16a may be within a range of 4-24 degrees, preferably within 10-20 degrees. An effective rake angel of the cutting insert 2, when it is mounted in a milling tool, is given by the obtuse angle ε, the wedge angle β, and the axial angle γ of the centre plane 8 in the insert seat 46, see below with reference to FIG. 3a. The major surfaces 28e, 28f of the first bottom surface 26a and the second bottom surface 26b, respectively, each form an angle of 90 degrees with the centre plane 8.

The insert body 4 is provided with a through hole 38. A fastening member may extend through the through hole 38 in order to releasably secure the cutting insert 2 to a relevant milling tool.

Figure 3A:
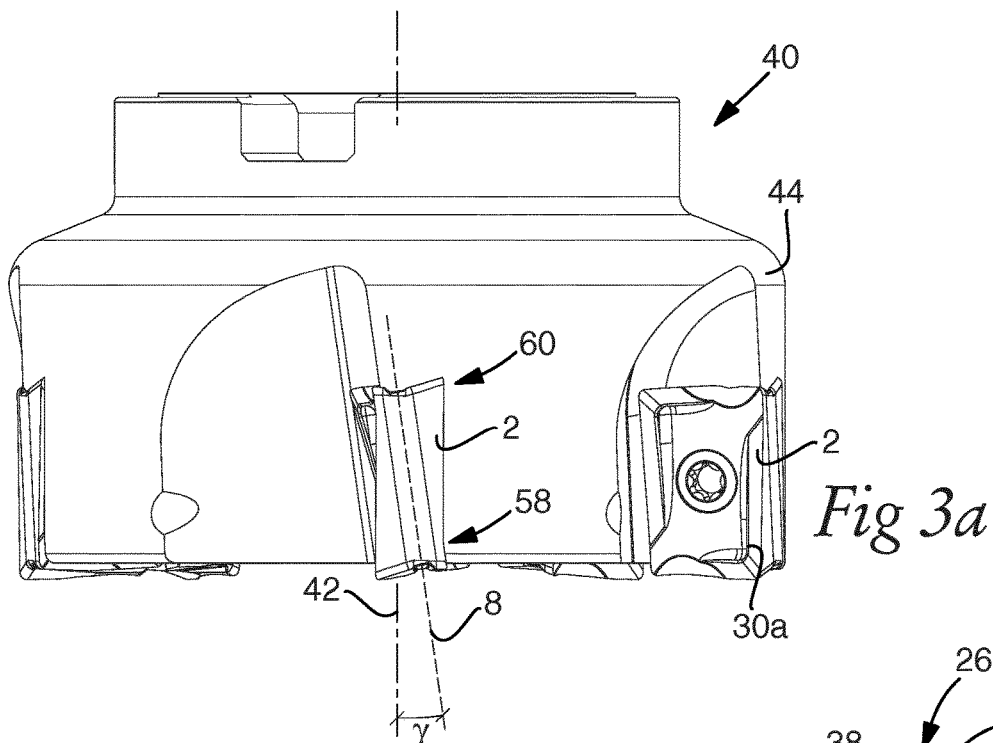
FIGS. 3a-3b illustrate embodiments of a milling tool.
Figure 3B:
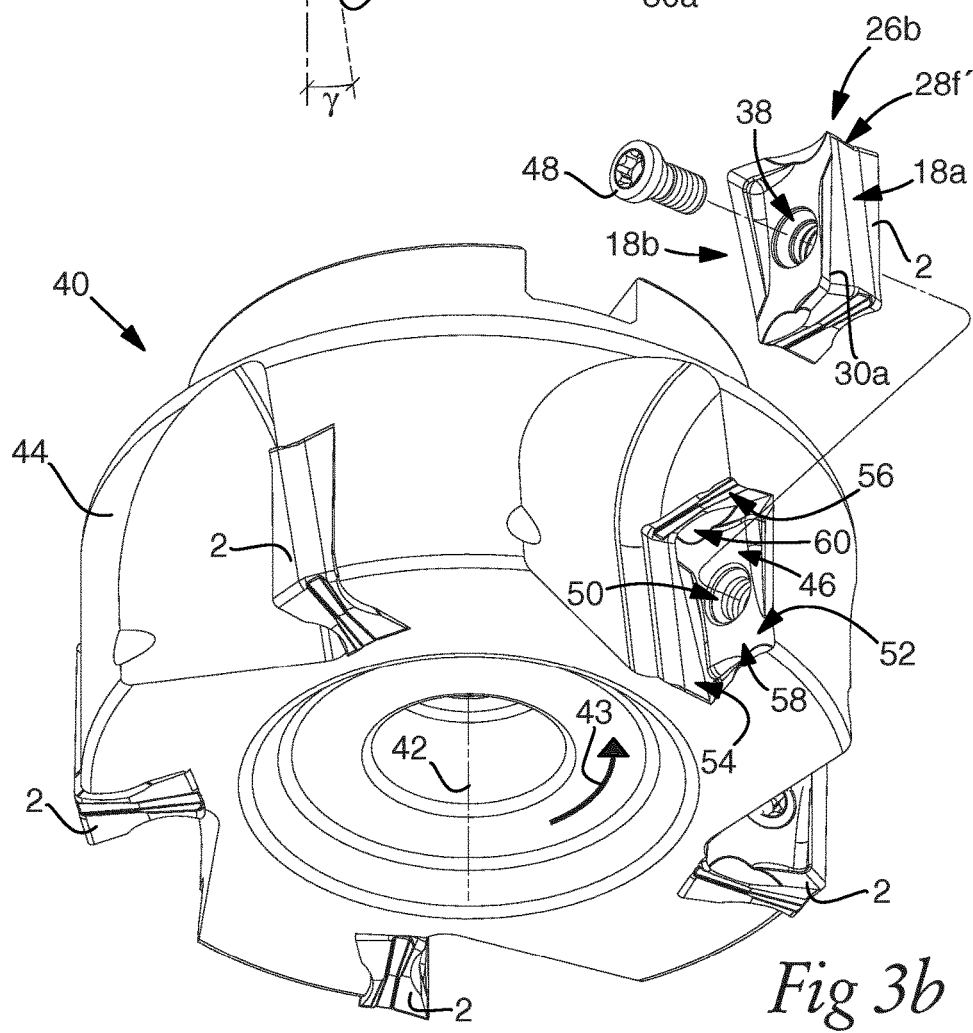

FIGS. 3a-3b illustrate embodiments of a milling tool 40. The milling tool 40 is a face milling tool. The milling tool 40 is configured to be rotated about a rotation axis 42 in a rotational direction 43 and comprises a tool body 44. At an axial end portion, the tool body 44 is provided with an insert seat 46 for receiving a cutting insert 2 according to any aspect and/or embodiment discussed herein. The cutting insert 2 is attached to the tool body 44 by means of a screw 48 extending through the through hole 38 of the cutting insert 2 and being screwed into a threaded hole 50 in the tool body 44 at the insert seat 46, as indicated in the exploded view of FIG. 3b.

In these embodiments the milling tool 40 is provided with five insert seats. In each insert seat a cutting insert 2 is arranged. In alternative embodiments the milling tool may be provided with less or more than the illustrated five cutting inserts 2. Suitably a large diameter milling tool is provided with more cutting inserts than a small diameter milling tool.

All the cutting inserts 2 are of the same kind. In alternative embodiments of the milling tool the cutting inserts may be of two or more different kinds.

The insert seat 46 is provided with a tangential support surface 52, a radial support surface 54, and an axial support surface 56. The cutting insert 2 is arranged with a portion of the second rake face 16b abutting against the tangential support surface 52, a portion of the second radial side 18b abutting against the radial support surface 54, and one of the major surfaces of the second bottom surface 26b of the second recess 24b abutting against the axial support surface 56, see also FIG. 1c. Thus, the cutting insert 2 is supported in the insert seat 46 with the first cutting edge 30a extending beyond the insert seat 46 for cutting engagement with a workpiece.

The said one of the major surfaces of the cutting insert 2 abutting against the axial support surface 56 is the major surface 28f' of the second bottom surface 26b closest to the first radial side 18a. (The major surface 28f' of the second bottom surface 26b closet to the first radial side 18a corresponds to the major surface 28f of the first bottom surface 24a at the second radial side 18b illustrated in FIG. 1d.)

The tangential support surface 52 extends from a first end portion 58 at an axial end of the tool body 44 to a second end portion 60 at the axial support surface 56 of the insert seat 46. Seen in the rotational direction 43 of the milling tool 40 the second end portion 60 extends ahead of the first end portion 58. Thus, the cutting insert 2 is positioned with the centre plane 8 at a negative axial angle γ in the insert seat 46. Due to the acute wedge angle β achieved as discussed above and as illustrated in FIG. 1c, the first rake face 16a adjacent to the cutting edge 32d is arranged at a positive axial rake angle.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. Although the invention has been described with reference to example embodiments, many different alterations, modifications and the like will become apparent for those skilled in the art. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A cutting insert for a milling tool, the cutting insert comprising:

an insert body having a central longitudinal axis extending along a longitudinal direction of the insert body and an imaginary center plane including the central longitudinal axis, the insert body having a top surface, a bottom surface, and a circumferential surface extending between the top surface and the bottom surface, the top and bottom surfaces extending substantially in the longitudinal direction on opposite sides of the center plane, wherein the insert body at the top surface includes a first rake face and the bottom surface includes a second rake face, the insert body at the circumferential surface including a first radial side and a second radial side extending in the longitudinal direction on opposite sides of the insert body, and a first axial side and a second axial side extending across the longitudinal direction on opposite sides of the insert body, wherein the first axial side has a first relief face, a second relief face, and a first recess, the first relief face extending along the first rake face and the second relief face extending along the second rake face, wherein the first recess extends between the first and second relief faces and includes a first bottom surface, and wherein the insert body includes at least a first cutting edge, the first cutting edge extending along a rim portion at an intersection between the first rake face and both the first radial side and the first axial side, the first relief face, the second relief face, and the first recess being arranged such that each point of the first relief face, the second relief face, and the first recess is visible from either a first side view towards the first radial side or from a second side view towards the second radial side, and such that the insert body is longer along the longitudinal direction at a central portion towards the central longitudinal axis than at an outer portion towards one of the first or second radial sides.

2. The cutting insert according to claim 1, wherein each of the first relief face, the second relief face, and the first bottom surface includes two major surfaces.

3. The cutting insert according to claim 2, wherein an angle between each of the two major surfaces of the first relief face, the second relief face, and the first bottom surface is obtuse, such that the insert body is longer along the longitudinal direction at a central portion of one of said major surfaces towards the central longitudinal axis than at an outer portion of said one of said major surfaces towards one of the first or second radial sides.

4. The cutting insert according to claim 2, wherein the two major surfaces of the first bottom surface are flat surfaces.

5. The cutting insert according to claim 2, wherein at least one of the major surfaces of each of the first and second relief faces is convex.

6. The cutting insert according to claim 1, wherein the first relief face forms an obtuse angle with the center plane, such that the insert body is longer in the longitudinal direction at the first cutting edge than adjacent to the first recess.

7. The cutting insert according to claim 1, wherein the first cutting edge includes a first edge portion and a second edge portion extending along the first relief face, a third edge portion extending along the first radial side, and a corner edge portion, wherein the first edge portion adjoins the second edge portion, the second edge portion adjoins the corner edge portion and the corner edge portion adjoins the third edge portion, and wherein the first edge portion extends at an angle to the second edge portion from the second edge portion towards the center plane.

8. The cutting insert according to claim 7, wherein the first edge portion forms an edge portion of a depression formed in the first rake face.

9. The cutting insert according to claim 1, wherein the second axial side includes a third relief face, a fourth relief face, and a second recess, the third relief face extending along the first rake face and the fourth relief face extending along the second rake face, wherein the second recess extends between the third and fourth relief faces and includes a second bottom surface, wherein the third relief face, the fourth relief face, and the second recess are arranged such that each point of the third relief face, the fourth relief face, and the second recess is visible from either the first side view towards the first radial side or from the second side view towards the second radial side, and such that the insert body is longer along the longitudinal direction at a central portion towards the central longitudinal axis than at an outer portion towards one of the first or second radial sides.

10. The cutting insert according to claim 9, wherein the insert body is longest along the longitudinal direction at a central portion adjacent to the central longitudinal axis and gradually decreases in length towards the first and second radial sides, such that a partition line of a multiaxial pressing tool for forming the cutting insert is arranged to be positioned at the central portion.

11. The cutting insert according to claim 9, wherein the insert body includes a second cutting edge extending along a rim portion at an intersection between the first rake face and both the second radial side and the second axial side, a third cutting edge extending along a rim portion at an intersection between the second rake face and both the first radial side and the second axial side, and a fourth cutting edge extending along a rim portion at an intersection between the second rake face and both the second radial side and the first axial side, such that the cutting insert is four times indexable in a milling tool.

12. A milling tool configured to be rotated about a rotation axis, the milling tool comprising:
a tool body, wherein the tool body at an axial end portion thereof is provided with at least one insert seat; and
a cutting insert arranged in the at least one insert seat, the cutting insert comprising an insert body having a central longitudinal axis extending along a longitudinal direction of the insert body and an imaginary center plane including the central longitudinal axis, the insert body having a top surface, a bottom surface, and a circumferential surface extending between the top surface and the bottom surface, the top and bottom surfaces extending substantially in the longitudinal direction on opposite sides of the center plane, wherein the insert body at the top surface includes a first rake face and the bottom surface includes a second rake face, the insert body at the circumferential surface including a first radial side and a second radial side extending in the longitudinal direction on opposite sides of the insert body, and a first axial side and a second axial side extending across the longitudinal direction on opposite sides of the insert body, wherein the first axial side has a first relief face, a second relief face, and a first recess, the first relief face extending along the first rake face and the second relief face extending along the second rake face, wherein the first recess extends between the first and second relief faces and includes a first bottom surface, and wherein the insert body includes at least a first cutting edge, the first cutting edge extending along a rim portion at an intersection between the first rake face and both the first radial side and the first axial side, the first relief face, the second relief face, and the first recess being arranged such that each point of the first relief face, the second relief face, and the first recess is visible from either a first side view towards the first radial side or from a second side view towards the second radial side, and such that the insert body is longer along the longitudinal direction at a central portion towards the central longitudinal axis than at an outer portion towards one of the first or second radial sides.

13. The milling tool according to claim 12, wherein the at least one insert seat is provided with a tangential support surface, a radial support surface, and an axial support surface, and wherein the cutting insert is arranged with a portion of the second rake face abutting against the tangential support surface, a portion of the second radial side abutting against the radial support surface, and a portion of the second bottom surface of the second recess abutting against the axial support surface.

14. The milling tool according to claim 13, wherein the second bottom surface includes two major surface portions, and wherein the portion of the second bottom surface abutting against the axial support surface is that major surface of the second bottom surface which is closest to the first radial side.

15. The milling tool according to claim 13, wherein the tangential support surface extends from a first end portion at an axial end of the tool body to a second end portion at the axial support surface of the insert seat, and wherein, as seen in a rotational direction of the milling tool, the second end portion extends ahead of the first end portion.

* * * * *